| United States Patent [19] | [11] Patent Number: 4,865,704 |
| Saatweber et al. | [45] Date of Patent: Sep. 12, 1989 |

[54] NON-AUTOCROSSLINKING BINDER COMBINATION FOR WATER-DILUTABLE LACQUERS

[75] Inventors: Dietrich Saatweber; Hans-Peter Patzschke, both of Wuppertal; Georg Hendrikx, Velbert; Klausjörg Klein, Wuppertal, all of Fed. Rep. of Germany

[73] Assignee: Herberts Gesellschaft mit Beschrankter Haftung, Wuppertal, Fed. Rep. of Germany

[21] Appl. No.: 86,700

[22] Filed: Aug. 18, 1987

[30] Foreign Application Priority Data

Aug. 19, 1986 [DE] Fed. Rep. of Germany ....... 3628121

[51] Int. Cl.$^4$ .................... C25D 13/06; C08L 63/00
[52] U.S. Cl. ............................... 204/181.7; 523/403; 523/404; 523/415; 523/409; 523/410; 523/411; 523/413; 524/901; 525/529; 525/530; 525/533
[58] Field of Search ................... 204/181.4, 181.7; 523/403, 404, 406, 408, 412–414; 525/523, 529, 530, 531, 533; 524/901

[56] References Cited

U.S. PATENT DOCUMENTS

| 4,174,332 | 11/1979 | Honig | 204/181.7 |
| 4,454,264 | 6/1984 | Patzschke | 204/181.7 |
| 4,554,212 | 11/1985 | Diefenbach | 204/181.7 |
| 4,576,979 | 3/1986 | Schupp | 204/181.7 |

*Primary Examiner*—John F. Niebling
*Assistant Examiner*—Ben C. Hsing
*Attorney, Agent, or Firm*—Michael O. Warnecke; Donald A. Peterson

[57] ABSTRACT

A non-autocrosslinking binder composition for water-dilutable lacquers containing 1 to 99% by weight of a hydroxyl group-containing and amino group-containing epoxide resin and 99 to 1% by weight of an amino groupcontaining synthetic resin binder prepared from free radically polymerizable monomers is described. Aqueous electrodip lacquer coatings containing this binder composition and capable of being deposited at the cathode and their use for coating articles having an electrically conductive surface at the cathode are also described.

11 Claims, No Drawings

NON-AUTOCROSSLINKING BINDER COMBINATION FOR WATER-DILUTABLE LACQUERS

BACKGROUND OF THE INVENTION

1. Field of the Invention

This invention relates to a non-autocrosslinking binder composition for water-dilutable lacquers, an aqueous electro-dip lacquer coating composition (KTL bath) capable of being deposited at the cathode and their use for coating articles.

2. Description of the Prior Art

Electro-dip lacquer coating compounds prepared on the basis of or using epoxide resins and capable of being deposited at the cathode are presently used on a large technical scale as electrophoresis lacquers or EC lacquers. They provide a high degree of throwing power and very high corrosion protection even on metal sheets which have not been phosphatized. Thermal crosslinking of these binders is carried out by various processes, e.g., by reactions with blocked polyisocyanates, by the addition of transesterifiable crosslinking agents or by the reaction of unsaturated double bonds (DE-A- 27 49 776; DE-A-34 36 345). Binders of this kind may give rise to surface defects such as pits which necessitate undesirable repair work in series lacquering. The properties of elasticity and resistance to stone chipping also require improvement.

Another class of materials of increasing importance are the KTL materials based on acrylate resins as described in DE-A-34 36 346. They are used on account of their low tendency to yellowing and high weathering resistance but do not attain the desired level of corrosion protection if the quality of phosphatization fluctuates.

SUMMARY OF THE INVENTION

It is therefore an object of the present invention to provide a binder composition and an aqueous electro dip lacquer coating composition capable of being deposited at the cathode which reduce the disadvantages described above and result in improved lacquers.

This problem is surprisingly solved by using mixtures of amino epoxides and amino group-containing acrylate resins as basic resin.

The present invention therefore relates to non-autocrosslinking binder compositions and aqueous electrodip lacquer coating compositions [KTL baths (cathodic dip coating baths)] containing these binders and capable of being deposited at the cathode, and their use for coating articles which have electrically conductive surfaces, as described herein:

More particularly, the non-autocrosslinking binder composition for water-dilutable lacquers comprises 1 to 99% by weight of a hydroxyl group-containing and amino group-containing epoxide resin and 99 to 1% by weight of an amino group-containing synthetic resin binder prepared from free radical polymerisable monomers.

DETAILED DESCRIPTION OF THE INVENTION

The non-autocrosslinking binder combination according to the invention for water dilutable lacquers contains:

A. 1 to 99% by weight of an organic synthetic resin binder based on epoxide resins and containing primary and/or secondary hydroxyl groups and primary, secondary and/or tertiary amino groups and B. 99 to 1% by weight of an organic synthetic resin binder containing primary, secondary and/or tertiary amino groups and prepared from radically polymerisable monomers, optionally together with conventional auxiliary agents and additives and, for example, crosslinking agents (as component C)).

Component (A) is preferably an amino epoxide resin capable of being diluted with water by neutralization with organic acids and having an amine number of 30 to 150 (mg KOH per g of solid resin), a hydroxyl number of 50 to 500 (mg KOH per g of solid resin), an average molecular weight ($\overline{M}n$) of from 250 to 10,000, preferably from 300 to 5,000, and a viscosity of 0.1 to 10 Pa.s, In particular 0.5 to 5 Pa.s in a 50% solution in monoglycol ethers at 25° C.

Component (B) is preferably a poly(meth)acrylate resin which is capable of being diluted with water after neutralization with organic acids and which has an amine number of 30 to 150, preferably 40 to 100 (mg KOH per g of solid resin), an hydroxyl number of 30 to 450, preferably 50 to 200 (mg KOH per g of solid resin), an average molecular weight ($\overline{M}n$) of from 1,000 to 500,000, in particular from 3,000 to 100,000, determined by gel permeation chromatography calibrated with polystyrene fractions, and a viscosity of 0.1 to 10 Pa.s in particular 0.5 to 5 Pa.s in a 50% solution in butoxyethanol at 25° C., and a glass transition temperature calculated from the glass transition temperatures of the homopolymers of from −50° to +150° C, in particular from −20° to +50° C.

The suitable average molecular weights and viscosities may be obtained by mixing resins of higher and lower viscosities or molecular weights.

The crosslinking agent optionally present as component (C) has at least two reactive groups per molecule and has an average molecular weight ($\overline{M}n$) of from 170 to 10,000, preferably from 250 to 5,000 and most preferably from 500 to 3,000. The following are suitable functional groups:

a. blocked isocyanate groups,
b. transesterifiable ester groups and/or
c. reactive, activated double bonds The synthetic resin binder (A) contains at least one amino group per molecule. The lower limit for the amine number should preferably be 45, most preferably 70, and the upper limit should preferably be 120, most preferably 100. If the amine number is too low then the solubility will be insufficient or the pH values in the deposition baths will be too acid due to an excessively high degree of neutralization. If the amine number is too high, the film will not adhere firmly when deposited or will have a blistered surface.

Examples of amino epoxide resins include reaction products of epoxide group-containing resins preferably with epoxide end groups taken from polyglycidyl ethers, polyglycidyl esters and polyglycidyl amines with saturated and/or unsaturated secondary and/or primary amines or amino alcohols. These may be modified on the alkyl group by at least one primary and/or secondary hydroxyl group, by the dialkylamino group and/or by a primary amino group which has been temporarily protected by ketimine formation.

Hydroxyl group-containing amino epoxide resins are suitably obtained from polyglycidyl ethers having at least one, preferably two 1,2 epoxide groups per molecule. Polyglycidyl ethers for the purpose of this invention are preferably those corresponding to the general formula

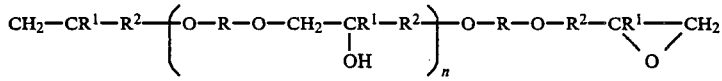

wherein

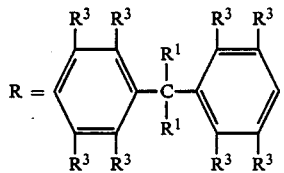

$R^1$ = H and/or $C_mH_{2m+1}$ $R^2 = (CR_2)_m-$, preferably $-CH_2-$ $R^3 = R^1$, halogen or, preferably, $-H$, n = 0 to 8, preferably 1 to 6 and m = 1 to 8, preferably 1

These polyglycidyl ethers have an average molecular weight ($\overline{M}n$) of about 300 to 5,000 and an epoxide equivalent weight of about 170 to 2,500. Such resins are reaction products of epichlorohydrin or methylepichlorohydrin with dihydroxy-diphenyl methane (bisphenol F) or dihydroxy-diphenyl propane (bisphenol A), or with dihydroxy-benzophenone or dihydroxynaphthalene. Polyepoxides with suitable molecular weights are obtained either by suitable choice of the molar ratios or bisphenol and epichlorohydrin or by reaction of the monomeric diglycidyl compounds with a further quantity of bisphenol with the addition of catalysts such as Lewis acids or phosphonium salts.

The epoxide resins may be completely or partly hydrogenated or used as mixtures with different structures and molecular weights. Thus for increasing the elasticity, a proportion of the polyglycidyl ether described is replaced by aliphatic polyglycidyl ethers corresponding to the formula

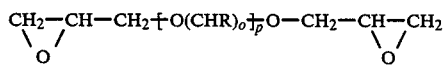

wherein

R=H or a lower alkyl group optionally having various substituents and o=2 to 6 and p=5 to 50

Examples are: polypropylene glycol and polybutylene glycol with different molecular weights. The modified epoxide resins may also be obtained by a reaction with longchained polyhydric alcohols such as hexane diol(1,6), neopentylglycol, bis-ethoxylated neopentylglycol, hydroxypivalic acid-neopentyl glycol ester and bis-(hydroxymethyl)-cyclohexane, monoanhydro-pentaerythritol and polytetrahydrofurane diol, polycaprolactone diol, polycaprolactam diol or polybutadiene diol in the presence of suitable basic or acid catalysts such as boron fluoride-amine complexes. Whereas polyhydric alcohols which contain primary OH groups can be directly reacted with polyglycidyl ethers if suitable catalysts are used, secondary OH groups are first reacted with diisocyanate. The NCO-terminated reaction product obtained can then easily be built in as a bridge between 2 mol of polyglycidyl ether, thus increasing the molecular weight and the functionality.

The amino epoxide resin may also be modified with saturated or unsaturated polycarboxylic acids and/or hydroxy carboxylic acids to lower the amine number. The following are examples of aliphatic, cycloaliphatic and/or aromatic polycarboxylic acids with different chain lengths: adipic acid, sebacic acid, fumaric acid, isophthalic acid and dimeric fatty acid. The hydroxy alkyl carboxylic acids may be lactic acid, dimethylolpropionic acid or polyesters containing carboxyl groups and hydroxyl groups. When excess polyglycidyl ethers of low molecular weight are reacted with polycarboxylic acids and/or polyhydric alcohols, modified polyglycidyl ethers are obtained as intermediate products which then undergo further reaction with amines and/or amino alcohols.

Heterocyclic polyepoxide compounds such as 1,3-diglycidyl-5, 5-dimethyl hydantoin, triglycidyl isocyanurate or diepoxides of bisimides may also be used. Another suitable class of polyepoxides are the polyglycidyl ethers of phenolic novolac resins which are capable of increasing the functionality from 2 to about 6 glycidyl groups per molecule. Elastifying elements may be incorporated by defunctionalization with long chained alkyl phenols such as dodecyl phenol. Polyglycidyl esters of polycarboxylic acids, such as hexahydrophthalic acid diglycidyl ester, tetrahydrophthalic acid diglycidyl ester or fumaric acid diglycidyl ester may also advantageously be used.

The amino groups are introduced either by the addition of NH reactive compounds to the epoxide group or by reaction of the hydroxyl groups of the underlying resin with basic mono isocyanates, which are formed by the reaction of aromatic and/or aliphatic and/or cyclo aliphatic di- or polyisocyanates with dialkylamino alkanol (see DE-A-27 07 405).

The NH-reactive compounds used may be primary monoalkylamines such as dialkylaminoalkylamine and/or preferably secondary monoamines, such as dialkylamines, monoalkylhydroxyalkylamines or dihydroxyalkylamines. The following are examples of suitable compounds: Diethylamine, dimethylaminopropylamine, N-methylaminoethanol, diethanolamine, and cyclic amines such as morpholine or oxazolidine. When primary amines such as octylamine, monoethanolamine, dimethylaminopropylamine, diethylaminoethylamine, dimethylaminoneopentylamine or methoxypropylamine are used, the amine reacts with 1 to 2 epoxide groups, depending on the stochiometric proportions provided, and increase in the molecular size takes place. When secondary diamines are used, chain lengthening occurs. The secondary diamines used, which are preferably long chained, may be N,N'-dialkyl-diaminoalkanes or reaction products of saturated glycidyl ethers or esters or epoxyalkanes with primary diaminoalkanes, such as the addition product of hexane-1,6-diamine with 2 mol of glycidyl ester of versatic acid (α-branched monocarboxylic acids, in particular with $C_9$–$C_{11}$). The monoepoxides used for this purpose may also be saturated or unsaturated glycidyl ethers or α-epoxides with various chain lengths, such as dodecene-1-oxide or butylene oxide. The suitable number of hydroxyl groups is on the one hand obtained automatically from the epoxide group on addition of the secondary amino groups and on the other hand may be controlled by means of hydroxyalkylamines.

The molar ratios of compounds containing epoxide groups to compounds containing amino groups should be so chosen that the amine will be completely incorporated because otherwise surface defects in the form of cavities may occur in the process of electrophoretic coating, in other words a slight excess of epoxide groups is advantageous.

All the amines may be reacted as a mixture with the epoxide groups or they may be reacted stepwise, i.e. one or more basic intermediate products containing epoxide groups may be prepared in various sequences. The reaction of the amines starts at room temperature and is generally exothermic. For complete reaction it is generally necessary to raise the temperature from time to time to about 50°–120° C. The resin containing 1,2-epoxide groups is dissolved in organic solvents before the amine is added. The solvents used may be substances such as xylene or methylisobutylketone, which must subsequently be distilled off before dilution is carried out, or substances such as ethoxyethanol, ethoxypropanol, diethyleneglycoldimethyl ether or diacetone alcohol, which may be left in solution. A thin layer evaporator or steam distillation may be used to remove excess amine.

The amino-epoxide resin of component (A) may be modified by means of suitable saturated or unsaturated compounds to achieve optimum lacquer technical properties. Unsaturated double bonds are introduced either directly by addition to the epoxide groups or indirectly by reaction of the hydroxyl groups of the basic resin with unsaturated monoisocyanates which are obtained by the reaction of aromatic and/or aliphatic and/or cycloaliphatic di- or polyisocyanates with α,β-unsaturated monocarboxylic acids or corresponding carboxylic acid amides and hydroxyalkyl(meth)acrylates or dicarboxylic acid esters of unsaturated alcohols such as allyl alcohol or hydroxyalkyl(meth)acrylates and which are described in DE-A-27 07 482.

The compounds are chosen so that by virtue of their structure they give rise to thermally stable urethane groups in the molecular structure. Direct addition to the epoxide group may be carried out, for example, with diallylamine, unsaturated fatty amines or unsaturated fatty acids. Unsaturated groups may also be built in by way of the chain lengthening agent. Thus unsaturated monoepoxides are added to di-or polyamines having at least two primary amino groups or at least one primary and one secondary amino group, such as hexane-1,6diamine, 3-aminomethylaminopropylamine, diethylenetriamine, trimethylhexamethylenediamine and isophoronediamine, as represented by the formula

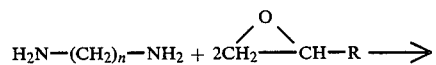

-continued

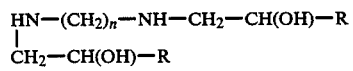

wherein: R = $-CH_2-O-CH_2-CH-CH_2$

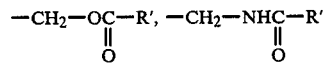

and R = unsaturated hydrocarbon group of monocarboxylic acids ($C_2$ to $C_{18}$)

The following unsaturated monoepoxide compounds may be used, as described in DE-A-31 22 641:

(a) Glycidyl esters of straight chained or branched, isolated or conjugated unsaturated $C_3$ to $C_{18}$ monocarboxylic acids, (b) Glycidyl ethers of straight chained or branched, isolated or conjugated unsaturated $C_3$ to $C_{18}$ monohydric alcohols.

Important improvements in properties are found according to DE-A-33 36 749 when molecules of an amineepoxide resin contain at least one molecular size-increasing diamine of the formula

wherein Y stands for H or $C_mH_{2m+1}$ (m=1 to 8) or an organic group which is used for defunctionalization and which is formed by the reaction of the primary amino group with mono epoxides, and X represents a molecular grouping containing at least one amide, urea and/or urethane group, the said groups being attached to the nitrogen atoms of formula (I) by alkylene groups containing 2 to 16 carbon atoms.

A diamine containing amide groups is obtained by the condensation of an aminocarboxylic acid with a primary diamine or the condensation of 1 mol of a dicarboxylic acid with 2 mol of a diamine. A diamine containing urea groups is obtained by the addition of diaminoalkanes to polyisocyanates containing at least two isocyanate groups. Thus 2 mol of a primary or secondary diamine or 1 mol of a primary or secondary monoamine and 1 mol of a primary diamine may be reacted with 1 mol of a diisocyanate.

For the invention, however, hydroxyl groups must always be present for the various crosslinking reactions. The hydroxyl number in the molecule (expressed in mg of KOH per gram of solid resin) determines the ability of the film to undergo crosslinking. It should be above 50, preferably above 100 and most preferably above 150. The upper limit of the hydroxyl number is 400 but is preferably below 300. If the hydroxyl number is too low, the films obtained on crosslinking are still soluble in organic solvents such as methylethylketone. If, on the other hand, the hydroxyl number is too high then the film becomes too brittle and may also remain too hydrophilic. The molecule must contain at least 2 hydroxyl groups which are capable of crosslinking, preferably primary hydroxyl groups.

The primary and/or secondary hydroxyl groups which are important for the crosslinking process may be partly replaced by primary and/or secondary amino groups. The introduction of primary amino groups into the basic structure of the resin is preferably carried out by the reaction of resins containing at least one, preferably at least two epoxy groups per molecule with a ketimine and/or aldimine and/or polyamine containing amino groups and/or hydroxyl groups. The preferred ketimines are reaction products of ketones and alkylamines containing secondary amino groups, such as methylisobutylketone and diethylenetriamine.

The ketimines are prepared in known manner from the corresponding polyamines having the general structure R—NH—R—NH$_2$ or the corresponding amino alcohols having the general structure HO—R—NH$_2$ and suitable aliphatic ketones such as diethylketone, methylisobutylketone, ethyl-n-propylketone or cyclopentanone, cyclohexanone, acetophenone etc. by a reaction involving the splitting off of water. The reaction conditions (reaction temperature, choice of solvent) must be so controlled that no substances capable of breaking the ketimine bond, such as water, are left in the reaction product.

The ketimine protects the primary amino group (see US-A-3 523 925) so that it can easily be reacted with the basic epoxide resin by way of another functional group, e.g. a hydroxyl group or, preferably, a secondary amino group. The molar ratios of the components put into the process must be chosen to ensure that no unreacted low molecular weight amine remains in the reaction mixture otherwise surface defects resembling perforations occur in the process of electrophoretic coating. The reaction of the secondary amino group of the polyamino ketimine with the epoxide group begins at room temperature and is generally exothermic. For a complete reaction, it is generally necessary to raise the temperature from time to time to 50°–120° C.

Component (B) of the binder combination according to the invention is an organic synthetic resin binder containing primary, secondary and/or tertiary amino groups and obtainable from radical polymerizable monomers. It is preferably a poly(meth)acrylate resin, in particular one which can be diluted with water as a result of neutralization with organic acids. "Poly(meth)acrylate" as used herein encompasses polyacrylate and polymethacrylate.

Water dilutable amino-poly(meth)acrylates are prepared according to the state of the art as described, for example, in DE-A-15 46 854, DE-A-20 57 799 or DE-A-23 25 177. The monomers capable of radical polymerization may be, for example, ethylenically unsaturated monomers, with the usual restrictions for copolymerizations as indicated by the Q- and e-scheme of Alfrey and Price, and according to the given copolymerization parameters (see Brandrup and Immergut, Polymer Handbook, 2nd ed. John Wiley & Sons, New York, 1975).

Component (B) is prepared from mixtures of various unsaturated monomers which either contain basic nitrogen atoms or into which such basic nitrogen atoms may be introduced by chemical reactions. Thus component (B) may be based, for example, on the following monomers which are all capable of radical polymerization:

(a) 6 to 40 parts by weight of monomers containing amino groups, (b) 4 to 50 parts by weight of monomers containing hydroxyl groups and (c) 10 to 90 parts by weight of radically polymerizable monomers, which contain no reactive groups apart from an unsaturated double bond, up to 10 parts by weight of component (c) being optionally replaced by radical polymerizable polyunsaturated monomers.

The radical polymerizable monomers containing amino groups and monomers containing hydroxyl groups need not be present in the form of a mixture. Types of monomers which contain both amino groups and hydroxyl groups may be used. In that case, 8 to 60 parts by weight of the monomers containing amino groups and hydroxyl groups and 10 to 90 parts by weight of the radically polymerisable monomers which contain no further reactive groups are used, up to 10 parts by weight of the latter optionally being radically polymerisable polyunsaturated monomers.

Monomers corresponding to the following general formula, for example, may be used as radically polymerisable monomers containing amino groups on N-groups:

$$R—CH=CR'—X—A—N(R'')_2$$

wherein
R = R' or X—C$_n$H$_{2n+1}$
R' = H or C$_n$H$_{2n+1}$
R'' = R', C$_n$H$_{2n}$OH and/or C$_n$H$_{2n}$NR$_2$
X = COO, CONH or O
A =

$$C_nH_{2n} \text{ or } C_nH_{2n}OHCH\underset{OH}{—}CH_2$$

and
n = 1 to 8, preferably 1 to 3.

The following are examples of unsaturated monomers containing N-groups: N-dialkyl- and N-monoalkylaminoalkyl(meth)acrylates such as, for example, N-diethyl-aminoethylmethacrylate or N-tertbutylaminoethylacrylate or the corresponding N-alkanol compounds, N-dialkyl- or N-monoalkylaminoalkyl(meth)acrylamide such as, for example, N-dimethylaminoethanol acrylamide or the corresponding N-alkanol compounds and/or heterocyclic compounds containing vinyl groups and having one or more basic nitrogen atoms such as, for example, N-vinyl imidazole.

By "radically polymerisable hydroxyl groupcontaining monomers" are meant monomers which in addition to containing a polymerisable, ethylenically unsaturated group contain at least one hydroxyl group on a C2 to C20 straight chained, branched or cyclic carbon structure. These are mainly unsaturated esterification products of the general formula $$R—CH=CR'—X—B$$

wherein
R, R' and X have the meanings indicated above and B denotes a straight chained or branched C$_{1-6}$ alkyl group with 1 to 3 OH groups.

(Meth)acrylic acid hydroxyalkyl esters are particularly suitable, such as, for example, 2-hydroxyethylacrylate, 2-hydroxypropylmethacrylate, butane-1,4-diolmonoacrylate, 2,3-dihydroxypropylmethacrylate, pentaerythritolmonomethacrylate, polypropyleneglycolmonoacrylate and fumaric acid dihydroxyalkyl esters, but N-hydroxyalkyl(meth)acrylamides and N-hydroxyalkylfumaric acid-mono-or-diamides such as N-hydroxyethyl-acrylamide or N-(2-hydroxypropyl)methacrylamide may also be used. Particularly elastic products may be obtained by using a reaction product of hydroxyalkyl-(meth)acrylate with ε-caprolactone. Other hydroxyl-containing compounds include allyl alcohol, monovinyl ethers of polyhydric alcohols, especially diols, such as the monovinyl ether of ethylene glycol or butane diol, and hydroxyl-containing allyl ethers or esters such as 2,3-dihydroxypropylmonoallyl ether, trimethylolpropane monoallyl ether or 2,3-dihydroxypropanoic acid allyl ester. Hydroxyethyl-, hydroxypropyl- and/or butane-1,4-diol-(meth)acrylate are particularly suitable.

"Ethylenically polyunsaturated monomers" are understood to be compounds having at least 2 radically polymerisable double bonds as represented by the general formula

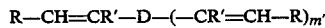

wherein $m = 1$ to 3, preferably $m = 1$ and, in addition to the definitions given above, D denotes the general supporting chemical structure for the reactive double bond. Examples of D include the o-, m- and p-phenyl group and groups of the formula -X-alkyl-X' wherein the alkyl group preferably has 2 to 18 carbon atoms and X and X' may represent identical or different linking groups, e.g. —O—, —CONH—, —COO—, —NHCOO— or —NH—CO—NH—. The symbol B may represent, for example, a benzene ring as in divinylbenzene, which may be substituted as in p-methyl-divinylbenzene or o-nonyl-divinyl benzene. Further examples of suitable polyunsatured monomers include reaction products of polyhydric alcohols, in particular dihydric alcohols, with $\alpha,\beta$-unsaturated carboxylic acids as already defined above. Examples include ethane dioldiacrylate, glycol-dimethacrylate, 1,4-butane dioldiacrylate, 1,6-hexane diol-diacrylate, neopentylglycoldimethacrylate, triethylene glycol-dimethacrylate, polyglycol-400-diacrylate, glycerol-dimethacrylate, trimethylolpropane-triacrylate and/or pentaerythritoldiacrylate. Polyfunctional monomers containing urethane groups and amide groups are prepared by the reaction of, for example, hexane diisocyanates or methacrylic acid-$\beta$-isocynato-ethyl ester with hydroxyethyl(meth)acrylate or (meth)acrylic acid. Examples of suitable compounds having a different structure include allyl methacrylate, diallylphthalate, butanedioldivinylether, divinylethylene urea, divinylpropylene urea, maleic acid diallyl ester, bis-maleic imides, glyoxabis-acrylamide and/or the reaction product of an epoxide resin with (meth) acrylic acid or fumaric acid semi esters. It is preferred to use difunctional unsaturated monomers such as butane diol diacrylate or hexane diol diacrylate. When glycidyl methacrylate and methacrylic acid are used, the corresponding glycerol dimethacrylate is automatically formed in the process of polymerization. The nature and quantity of polyunsaturated monomers should be carefully adjusted to the reaction conditions (catalysts, reaction temperature) in order that the desired high viscosity may be obtained without gel formation. Complete incorporation of the polyunsaturated monomers is preferred, i.e. the product which has been incorporated by polymerization virtually contains no more double bonds.

The choice of radically polymerizable monomers which contain no reactive groups apart from the mechanical properties of the film and the compatibility of the resin combination used. Acrylic acid alkyl esters, methacrylic acid alkyl esters and maleic and/or fumaric acid dialkylesters are used, the alkyl groups having 1 to 20 carbon atoms arranged in a straight or branched aliphatic chain and/or as a cycloaliphatic and/or (alkyl)-aromatic group. So called "hard" monomers which have a high glass transition temperature when in the form of polymers include, for example, monomers of the aromatic vinyl type such as styrene, $\alpha$-substituted styrenes such as $\alpha$-methyl styrene, o-,m- and p-alkyl styrenes such as vinyl toluene or p-tert.-butyl styrene, halogenated vinyl benzenes such as o- or p-chloro styrene, short chained methacrylic acid esters such as methyl methacrylate, ethyl methacrylate, propyl methacrylate, butyl methacrylate, cyclohexyl methacrylate, isobornyl methacrylate, dihydrodicyclopentadienyl methacrylate, (meth)acrylamide and/or (meth)acrylonitrile. "Soft" monomers include acrylic acid esters which have a long alcohol chain, such as N-butylacrylate, isobutylacrylate, ter.-butylacrylate, 2-ethyl hexylacrylate and/or laurylacrylate. Unsaturated ethers such as ethoxyethylmethacrylate or tetrahydrofurfurylacrylate may also be used. Monomers of the vinyl ester type, preferably vinyl esters of $\alpha$-branched monocarboxylic acids such as versatic acid vinyl ester, may also be incorporated by polymerization if suitable reaction conditions and reaction comonomers are chosen.

Copolymerization is carried out in known manner by solution polymerization with the addition of radical initiators and optionally molecular weight regulators at temperatures of 50° to 180° C. It is carried out in a liquid in which both monomers and polymers dissolve. The monomer content or the polymer content after polymerization is about 50 to 90% by weight. Solution polymerization in organic solvents which are dilutable with water is preferred. The following are examples of such solvents: ethylene glycol, methyl ethanol, butoxy ethanol, diethylene glycol, triethylene glycol, diethylene glycol-dimethylether, propylene glycol, methoxy propanol, ethoxy propanol, dipropylene glycol-monomethyl ether, dipropylene glycol dimethyl ether, diacetone alcohol, ethanol, isopropanol, sec.butanol, tert. butanol, acetone, methoxypropanone, dioxane, tetrahydrofuran, N-methylpyrrolidone and mixtures thereof.

The solvent or solvent mixture is generally heated to the reaction temperature and the monomer mixture is then run in over a period of several hours. In order that the process may be carried out at the reflux temperature, the initiator is adjusted to the boiling point of the solvent mixture. It normally decomposes with a half life of 30 minutes to 10 hours. The initiator is either dissolved cold in the monomer mixture or for safety reasons is added separately during the inflow of monomers. From 0.1 to 5% by weight, preferably from 0.5 to 3% by weight of peroxides and/or azo compounds, based on the quantity of monomers, are added as catalysts which are soluble in organic solvents. The peroxides used may be, for example, benzoyl peroxide or di-tert.-butyl peroxide, hydroperoxides such as tert.-butyl-hydroperoxide or cumene hydroperoxide; or per esters may be used, such as tert.butyl peroctoate or tert.-butyl-perbenzoate. Examples of azo compounds which are decomposed by heat include 2,2'-azo-bis-(2-cyano propane) and 1,1'-azo-bis-cyclohexane carbonitrile. The initiators used may be radical forming compounds of the dibenzyl type such as 1,2-bis-(4-methylphenyl)-1,2- dicarbethoxy-1,2-dicyano-ethane. The molar mass may be reduced in known manner by means of regulators. Mercaptans, halogen-containing compounds and other radical transmitting substances are preferably used for this purpose. Particularly preferred compounds are n- or tert-dodecyl mercaptan, tetrakis-mercaptoacetyl pentaterythritol, tert-butyl-o-thiocresol, thiosalicylic acid, buten-1-ol and dimeric α-methyl styrene.

The amino(meth) acrylate resins may also be prepared by a polymer-analogous reaction. Thus, for example, a copolymer containing acrylamide groups may be reacted with formaldehyde and a secondary amine and/or amino alcohol. A particularly preferred process is described in DE-A-34 36 346, in which monoethylenically unsaturated monomers containing epoxide groups are first incorporated in the copolymer by polymerization. A reaction is then carried out with excess primary and/or secondary monoamines and/or monoamino alcohols and the excess of amine is finally distilled off.

The radical polymerisable monomers containing epoxide groups may be mono- and/or di-glycidyl compounds of α,β-unsaturated acids, acid amides, alcohols or amines, such as, for example, glycidyl esters and β-methylglycidyl esters of (meth)acrylic acid, of fumaric acid and/or of maleic acid and of fumaric and/or maleic acid monoalkyl esters, and glycidyl compounds of (meth) acrylic acid amide, fumaric acid diamide, maleic acid diamide or maleic imide and/or glycidyl ethers of unsaturated alcohols such as vinyl and/or allyl alcohol. Other suitable compounds are monoglycidyl esters of dicarboxylic acid monoesters with unsaturated alcohols, such as phthalic acid-allyl-glycidyl ester, but vinyl and allyl esters of epoxidized fatty acids may also be used, such as 2,3-epoxy-butteric acid allyl ester or epoxy stearic acid allyl ester. Diolefines in which one double bond has been epoxidized are also suitable, such as vinyl-ethylene oxide, 1-methyl-1-vinyl-ethylene oxide or 3,4-epoxy-1-vinyl-cyclohexane. Glycidyl acrylate and glycidyl methacrylate are preferred for the copolymerization. The proportion of unsaturated monomers containing epoxide groups in the copolymer is generally from 8 to 50% by weight. The lower limit is preferably 12% by weight and the upper limit 35% by weight. Polymerization must have run to completion before the reaction with amines takes place because otherwise reversible side reactions with the secondary amines take place on the activated double bonds of the monomers.

Suitable secondary amines for the reaction with the epoxide groups are particularly those corresponding to the formula

wherein
R=H or R'
R'=$C_nH_{2n+1}$, $C_nH_{2n}OH$ and/or $C_nH_{2n}$—N=$CR_2$
and
n=1 to 8, preferably 1 to 2.

The following are examples of amines which may be used for the reaction; $C_1$ to $C_6$ dialkylamines having identical or different alkyl groups in the molecule, such as dimethyl-, diethyl-, diisopropyl-, dibutyl-, methylethyl-, methyl-, propyl- and methyl-butyl-amine, and monocycloaliphatic amines such as morpholine, piperidine, pyrrolidine or oxazolidine, and/or monoalkanolamines such as N-methyl-amino ethanol and/or dialkanolamines such as diethanolamine or diisopropanolamine. Examples of primary amines or amino alcohols include $C_1$ to $C_8$ alkylamines such as ethylamine, and 2-ethyl-hexylamine or amino ethanol. Alkyl groups having 1 to 4 carbon atoms, in particular 1 and/or 2 carbon atoms are preferred in all cases. Secondary amines such as dimethylamine, diethylamine, methyl ethyl amine and N-methyl-amino ethanol are particularly preferred as highly soluble ET baths with a high pH value can be obtained when these are used. The primary amines mentioned above are in most cases used as mixtures with secondary amines because the products obtained are otherwise too highly viscous.

A similar reaction, for example, may be carried out, preferably in equivalent quantities, with ketimines of polyamines containing a secondary amino group and one or more primary amino groups, such as, for example, the mono ketimine of methylisobutyl ketone and methylaminopropylamine or the diketimine of methylisobutyl ketone and diethylene triamine.

The number of primary and/or secondary hydroxyl groups is optimized so that a highly crosslinked, solvent resistant film is formed when the lacquer is stoved. Considering that one secondary OH group is formed from each epoxide group in the reaction with amine, it is suitable to incorporate by polymerization at least one additional hydroxyl group per molecule, preferably a primary hydroxyl group through other unsaturated monomers. The number of epoxide groups determines the number of amino groups reacting therewith and hence also the solubility of the product. At least one epoxide group per molecule should be present. It is frequently advantageous to combine a high hydroxyl number with a low amine number. The object aimed at is generally a readily soluble product with a low degree of neutralization add a very high pH value.

According to the invention, the above described non-auto crosslinking amino-poly(meth)acrylate resins free from epoxide groups are used in the binders for cathodic deposition in ET baths (KTL baths). In addition to containing amino epoxide resins as component (A) and amino(meth)acrylate resins as component (B), they may contain the following component (C) as cross-linking agent. In addition, they may contain the usual additives such as those described, for example, in the literature references to KTL which have been mentioned above and some of which are described in more detail below.

Examples of components (C) include formaldehyde condensation resins (urea-,melamine-, benzoguanine- or phenol- formaldehyde resins), blocked polyisocyanates, resins containing transesterifiable ester groups and/or resins with activated double bonds. Component (C) may be present together with conventional catalysts.

Blocked polyisocyanates are prepared by the reaction of a multi-functional isocyanate with at least a stochiometric quantity of a monofunctional compoud containing active hydrogen (Zerewitinoff reaction), optionally with the addition of basic catalysts such as tertiary amines or small quantities of tin salts such as dibutyltin dilaurate. The isocyanate group is thereby protected against reactions with water or alcohols at room temperature. The reaction product obtained reacts with the hydroxyl groups of the amino-poly(meth)acrylate resin when heated so that the protective group is split off. This group is split off at stoving temperatures below 210° C., preferably at temperatures below 190° C., most preferably below 180° C. but above 110° C., preferably above 140° C., most preferably above 150° c. so that the isocyanate group released can react with the basic resin. Agents which block the isocyanates contain only a single amine, amide, lactam, thio or hydroxyl group. Compounds which have proved suitable for this purpose include, for example, aliphatic and cycloaliphatic alcohols such as 2-ethylhexanol, dialkylamino alcohols such as dimethylaminoethanol, oximes such as methylethylketoxime, lactams such as ε-caprolactam or pyrrolidone-2, imides such as phthalimide or N-hydroxymaleic imide, hydroxyalkyl esters, and esters of malonic acid or of aceto acetic acid. β-hydroxyglycols and ethers thereof and glycol amides are also recommended.

Aliphatic, cycloaliphatic and/or aromatic polyisocyanates containing at least two isocyanate groups per molecule are suitable as typical multifunctional isocyanates. Suitable aromatic diiosocyanates include the isomers and isomeric mixtures of phenylene diisocyanate, toluene diisocyanate, xylylene diisocyanate, biphenylene diisocyanate, naphthylene diisocyanate, diphenylmetane diisocyanate, diphenyltetraisocyanate, and naphthyltetraiosocyanate. (Cyclo)aliphatic diisocyanates give rise to products with little tendency to yellowing owing to their high resistance to ultra violet light. Examples of such diisocyanates are isophorone diisocyanate, cyclopentylene diisocyanate, and the hydrogenation products of aromatic diisocyanates such as cyclohexylene diisocyanate, methylcyclohexylene diisocyanate and dicyclohexylmethane diisocyanate. The aliphatic diisocyanates include compounds corresponding to the formula

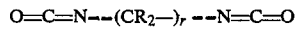

$$O=C=N-(CR_2-)_r-N=C=O$$

wherein r represents an integer from 2 to 20, in particular 6 to 8 and the substituents denoted by R, which may be identical or different, are hydrogen or a lower alkyl group with 1 to 8 carbon atoms, preferably 1 or 2 carbon atoms.

Examples include trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Isophorone diisocyanates and dicyclohexyl methane diisocyanates are particularly preferred diisocyanates.

Vinyl polymers which contain isocyanate groups and have been obtained by the copolymerization of, for example, cyanato ethyl(meth)acrylate or dimiethyl-isopropylbenzyl isocyanate with alkyl(meth)acrylate and/or (alkyl)vinyl benzenes may also be used.

Mixed aliphatic/aromatic isocyanate compounds are also suitable.

Products obtained by the trimerization or oligomerization of diisocyanates or by the reaction of diisocyanates with compounds containing polyfunctional OH- groups or NH groups have been found to be suitable for use as triisocyanates. These include, for example, the commercially available products already described for component (B). The average functionality may if desired be lowered by the addition of monoisocyanates. Examples of such chain breaking monoisocyanates are phenyl isocyanate, cyclohexyl isocyanates and stearyl isocyanate.

An increase in the size of the molecule may also be obtained by a reaction with polyhydric alcohols containing tertiary amino groups, such as N-methyldiethanolamine, or triethanol amine, or polyamines containing tertiary amino groups, such as 3-(methyl)-3-(2-amino ethyl)-aminopropylamine. Chain breaking N-dialkyl-aminoalcohols such as dimethyl amino ethanol or N,N-dialkyl-alkylene diamines such as dimethylaminopropylamine or N,N-diethyl-N'-methyl-1,3-ethane diamine may be used to improve the solubility. Isocyanate-containing prepolymers based on polyglycol ethers, polyesterpolyols, polycaprolactonepolyols and/or polycaprolactampolyols may also be used to advantage. Aliphatic and cycloaliphatic polyisocyanates are preferred for non yellowing one-coat lacquers.

Another suitable type of crosslinking agent (component C) is a resin having esterified carboxyl groups in end positions or side positions which are substantially stable in a neutral, aqueous medium but react with 1 or more hydroxyl group-containing resins (components A and B) in the basic medium of the deposited film at temperatures higher than about 140° C. In this reaction, the transesterifiable ester groups undergo esterification with the hydroxyl groups of components (A) and (B) and the readily volatile "alcoholic protective groups" are split off. Substantially all the carboxyl groups in end positions or side chains should be esterified with alcohols which are volatile under the stoving conditions. In order to prevent migration of the polyester to the anode, care should be taken to ensure that the polyester has an acid number below 20, preferably below 10, most preferably below 3.

The reactivity of the esters is increased by a suitable chemical structure, e.g. by an increase in the electrophilic activity of the carboxyl group or by a negative inductive effect on the alcohol group. Esters of primary, secondary and tertiary carboxyl groups are capable of transesterification. Esters of primary carboxyl groups are preferred on account of their higher reactivity.

The transesterification is assisted by the volatility of lower straight chained or branched primary monohydric alcohols or by 1,2-glycols which may be substituted by ether or ester groups. The lower the molecular weight of the alcohols split off in the transesterification reaction, the lower are the losses due to their being split off. Methanol and ethanol are particularly preferred. Numerous crosslinking agents containing ester groups suitable for transesterification with OH groups and/or transamidation with NH₂ groups are described in the literature, e.g. in EP-A-0 04 090, EP-A-0 12 463, DE-A-31 03 642, EP-A-0 82 291, DE-A-33 766 and DE-A-34 36 345.

Crosslinking agents (component C) containing activated double bonds which are capable of reacting either with unsaturated double bonds of component (A) or with the hydroxyl groups or primary or secondary amino groups of component (A) and/or (B) are described in U.S. Pat. Nos. 3,921,181, and 3,975,251, and in the unpublished German Patent applications T31499 (LP 769) and T31455 (LP 763). They consist of polymerization, polycondensation and/or polyaddition resins, containing an average at least two ethylenically double bonds in end positions or side chains per molecule. The reaction which proceeds from the double bonds should take place sufficiently rapidly to result in adequate crosslinking at stoving temperatures of 140° to 160° C. or less. Double bonds of acrylic and/or methacrylic groups are particularly suitable for this purpose. The reaction may be accelerated in known manner by the choice of suitable siccatives of heavy metals with organic monocarboxylic acids, optionally with the addition of complex forming compounds such as phenanthrolein.

Suitable low molecular weight acrylic acid compounds may be used as component (C), such as ethylene glycol diacrylate, 1,3-butylene glycol diacrylate, bisphenol-A diacrylate, diethylene glycol diacrylate, triethylene glycol diacrylate, tetraethylene glycol diacrylate, 1,6-hexane dioldiacrylate, polyethylene glycol diacrylate, trimethylol propane diacrylate, trimethylol propane triacrylate, pentaerythritol diacrylate, pentaerythritol triacrylate, pentaerythritol tetra acrylate and melamine acrylate and the corresponding methacrylic acid compounds.

Relatively high molecular weight unsaturated polymerization resins may be prepared by first preparing a copolymer with functional groups which are suitable for the introduction of compounds with suitable double bonds in a second reaction step. Thus polymer resin containing amide or carboxyl groups may be reacted with glycidyl acrylate or glycidyl methacrylate. The reaction temperature for this reaction must be chosen to ensure that the $\beta$-hydroxy esters or amides formed in the reaction are not split off by transesterification during stoving. Other possibilities lie in the reaction of the glycidyl(meth)acrylate copolyers with acrylic acid or methacrylic acid or the reaction of hydroxyl groupcontaining poly(meth)acrylate resins with methylolated(meth)acrylamides which may be esterified with lower alcohols.

Component (C) may also be prepared by the reaction of diisocyanates or polyisocyanates, prepolymers containing isocyanate groups, precondensates and synthetic resins with hydroxy alkyl(meth)acrylate, e.g. by a reaction of the reaction product of 1 mol of trimethylol propane and 3 mol of tolylene diisocyanate with 3 mol of 2-hydroxyethylacrylate. Particularly preferred is the preparation of relatively high molecular weight polyurethane and/or poly urea resins containing isocyanate groups, which resins are subsequently reacted with hydroxy ethyl or hydroxy propyl(meth)acrylate in a second reaction stage.

The crosslinking agent may contain tertiary amino groups to improve the dispersion in water. In such cases, the quantity of tertiary amino groups must be large enough or small enough to ensure mutual electrophoretic deposition with components (A) and (B).

Groups containing double bonds, e.g. the acrylic group, may, of course, also be directly introduced into the synthetic resin molecule of component (A), thus giving rise to CED binders which are to a certain extent self crosslinking. It is, however, advantageous to add component (C) to the system as a reactive diluting component, whereby CED-coatings with greater layer thickness (30 to 50 $\mu$m) and excellent throwing power are obtained. In order that as little product as possible will be split off in the crosslinking reaction, component (C) should contain, per molecule, on average less than 1 terminal ester group capable of undergoing transesterification in the stoving process, preferably less than 0.5 such group per molecule and most preferably component (C) should be substantially free from terminal ester groups which are capable of transesterification in the stoving process or blocked isocyanate groups. By "substantially" is meant that the component is virtually free from all such groups although in high molecular weight products of this kind it is always possible that a very small amount of such groups is present.

If primary and secondary amino groups are present in the binder, care must be taken to ensure that the system only contains terminal or side-position double bonds of the kind which, though reactive in the sense of the invention, i.e. capable of crosslinking in the stoving process, e.g. double bonds of the formula

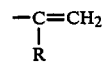

wherein

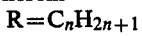

are not particularly activated towards primary and secondary amines.

From 50 to 5% by weight of crosslinking agents (component C) are used for 50 to 95% by weight of components (A) and (B), as in accordance with the state of the art, and the crosslinking agents used may consist of products known in the art. The KTL (cathodic dipcoating bath) bath may in addition contain, emulsified therein, up to 30% by weight of hydroxyfunctional resins which are reactive with the crosslinking agents (see e.g. EP-A-0 04 090).

The proportions in which components (A+B) and (C) are mixed together are preferably in the range from 90:10 to 60:40 and are determined empirically from the optimum application technical properties obtainable at the given stoving temperature. It may in some cases be advantageous to use a combination of several crosslinking systems.

Crosslinking of the OH group-containing components (A) and (B) with blocked polyisocyanates may be accelerated by the addition of from 0.01 to 2% by weight, especially from 0.5 to 1% by weight, of strongly basic tertiary amines and/or active metal compounds, based on the solid resin content of components (A) and (B). A special, sometimes synergistic action is obtained by the combination of basic medium of the deposited OH group-containing resin and the metal salts of bismuth, lead, cobalt, iron, antimony and/or tin-II and -IV. Catalysts such as iron-III acetyl acetonate, dibutyl tin dilaurate, tri-n-butyl tin oxide, dibutyl tin dioctyl maleate, tin octoate, tin oleate, tetrabutyl titanate and/or cobalt-2-ethyl hexoate are particularly preferred.

Catalysis of the transesterification process generally requires a higher catalyst content. Metal oxides, metal salts or metal complexes of monovalent or polyvalent metals are suitably used in quantities of 0.1 to 10% by weight, preferably 20 to 6% by weight, based on components (A) and (B). They are generally dissolved in aliphatic and aromatic hydrocarbons after salt formation with 2-ethyl-hexanoic acid or naphthenic acid. These solutions are incorporated in the electrophoretic bath by emulsification. Another possibility consists of complex formation of the metals with acetyl acetonate, dicyclopentadiene, 8-oxy-hydroquinoline, 4-methycatechol and/or 2,5-dimercapto-1,3,4-thiodiazole.

Examples of suitable catalysts are antimony trioxide, cobalt naphthenate, lead octoate, iron acetyl acetonate, the reaction product of zinc oxide and 8-oxyhydroquinoline, thallium dicyclopentadiene and triethanolamine titanate. Lead octoate and zinc oxyhydroquinolate are preferred. The metal catalysts may also be dispersed in a finely divided form as pigments such as lead silicate. Water dilutable metal salts are also suitable as transesterification catalysts if the metal is deposited in a finely divided form as complex or complex together with the lacquer. Catalysts which are only sparingly soluble in the ET bath and become uniformly distributed in the deposited film during stoving after electrophoretic deposition are preferred.

Components (A), (B) and (C) may be mixed in the cold but component (C) may be precondensed with (A) and/or (B) at an elevated temperature. Components (A) or (B) and (C) react with each other to a certain extent without the mixture losing its capacity to be hardened by heat and rendered water soluble by protonization with acid.

To obtain a good balance of application technical properties, the resin which can be deposited at the cathode should advantageously contain, in addition to the crosslinking agent, up to 30% by weight, preferably from 5 to 20% by weight of a hydroxy functional resin which reacts with blocked polyisocyanates and with the transesterifiable crosslinking agents. Thus hydroxyfunctional resins with OH number 30 to 500, in particular 50 to 300, and an average molecular weight ($\overline{Mn}$) of from 300 to 5,000 especially from 500 to 3,000 may be used to increase the throwing power. Examples of such resins include styrene-allyl alcohol copolymers, (meth)acrylic copolymers containing OH groups, caprolactone polyols, caprolactam polyols, urethane polyols, and polyethers and polyesters containing OH groups.

The resins should contain a sufficient number of polar groups, preferably primary OH groups, to enable them to be completely emulsified in the neutralized basic resin mixture (components (A) and (B)). A small amine number, less than 30, preferably less than 20, may be incorporated to improve the compatibility and dilutability with water.

The molecular weight range is chosen so that the resins will no longer be volatile but good film formation will nevertheless be obtained due to improved fluidity. If precondensation is carried out, this may be effected in any sequence.

The cationic binder mixture is rendered capable of dilution with water by the known method of protonation with acids. Examples of acids include formic acid, lactic acid, acetic acid, propionic acid, citric acid, malonic acid, acrylic acid, phosphoric acid and alkylphosphoric acid. Mono basic, low molecular weight organic carboxylic acids are preferred. It is necessary to add at least sufficient acid to result in stable emulsification of the cationic base resin. An excess of acid, i.e. a degree of neutralization above 100%, is preferably avoided. The MEQ value (milli equivalents of acid per 100 g of solid resin) is generally in the range of 20 to 80. The MEQ value should be as low as possible in order that a high deposition equivalent may be obtained.

The coating compound may contain up to about 20% by weight of organic solvents for the purpose of lowering the viscosity, controlling the deposition voltage and improving the adherence and leveling properties. The organic solvent content should be as low as possible, preferably below 15% by weight, most preferably below 10% by weight. The solvents used may be alcohols, glycol ethers or keto alcohols, optionally with the addition of aliphatic and/or aromatic hydrocarbons with various chain lengths. When making a choice of solvent, it should be borne in mind that the crosslinking agent is not water soluble and a certain proportion of water insoluble solvents may facilitate and stabilize the dispersion process. The throwing power suffers and the thickness of the layer deposited increases with increasing solvent content and excessive coating may occur.

Water insoluble solvents are more powerful in this respect than water soluble solvents. A proportion of water insoluble, high boiling solvents such as hexylene glycol, phenoxyethanol, ethylhexanol, isodecanol or 2,2,4-trimethyl-pentanediol-1,3-monoisobutyrate may be added to improve leveling and lower the coating impedance. Aprotic solvents which may be necessary for the preparation of the resins may be distilled off and replaced by other solvents after preparation of the product.

The coating compound according to the invention should suitably have a solids content of from 5 to 50% by weight after dilution with water. If the lacquer is adjusted to a relatively high solids content in the region of 25 to 50% by weight, preferably 30 to 45% by weight, water dilutable stoving lacquers are obtained which can be applied to the object to be lacquered by immersion, spraying, roller application, etc. If, on the other hand, the coating compound is diluted to a solids content of 5 to 30% by weight, preferably 10 to 20% by weight, the lacquer is suitable for electrophoretic deposition. The bath is stirred continuously in order to maintain a constant temperature at the cathode surface and prevent deposition of the insoluble components of the dispersion, e.g. the pigments. The pH of the lacquer is generally from 4.0 to 7.5, preferably from 5.0 to 6.5. If the pH is too low, the acid is liable to attack the iron of the containers, pipes and pumps. Electrophoretic deposition should be carried out at the earliest 24 hours after preparation of the bath. During this time, the bath should be stirred continuously to ensure uniform distribution. Electrically conductive, non-corrosive electrodes, e.g. of stainless steel or graphite, are used as anodes. Both the article to be coated at the cathode and the anode are immersed in an aqueous bath in the known manner employed for electrophoretic deposition. Any metallically conductive work pieces may be coated, such as pieces of copper, aluminum, tin, zinc, iron and alloys of these metals. The bath temperature is suitably maintained at about 15° to 35° C. during deposition. The solids content, deposition temperature and time and voltage are so chosen that the desired layer thickness is obtained after the article has been rinsed with water and/or ultra filtrate and stoved at temperatures of about 150° to 230° C. Thus, for example, the layer thickness increases with increasing coating time and deposition voltage. When an electric current is applied at a voltage of, suitably, 50 to 500 volts between the metallically conductive work piece and a counter electrode, the water dilutable basin resin is coagulated at the cathode and carries the water insoluble crosslinking agent, pigments, catalysts, etc. with it. In this process, the proportion of pigment to synthetic resin binder in the deposited film may shift in favor of the pigment. At the same time, water and the acid used for neutralization accumulate in the bath. Refilling must therefore be carried out with concentrated lacquers which compensate for this shift by altering the proportions. The same correction may also be achieved by means of suitable apparatus, e.g. by means of electrodialysis or ultra filtration.

The concentrated binder according to the invention which is to be diluted with water and which has a solids content of, for example, about 85 to 60% by weight, may be pigmented in the usual manner in a ball mill, three roller mill or pearl mill. Conventional pigments such as, for example, those described in DNI 55 944, fillers, corrosion inhibitors and lacquer auxiliaries such as anti-pitting agents, leveling agents and anti foamants may be used. These would, of course, be chosen so that they do not undergo any unwanted reactions with water in an acid to neutral medium, do not introduce any water soluble foreign ions, and do not precipitate on aging in such a manner that the coagulate can no longer be dispersed by stirring. The lacquers are particularly suitable for electro-dip lacquering of metals and after stoving, preferably for 15 to 45 minutes at 130° to 190° C., they give rise to smooth base coats free from pitting and with improved covering of the edges and improved elasticity, and glossy, weather resistant films which have little tendency to yellowing and give an improved performance in the salt spray test are obtained. The pigment-binder ratio depends on the dispersability and viscosity of the binder and is generally in the range of from 0.1:1 to 1.5:1.

If the binder combination according to the invention is to be used for the preparation of coating materials intended for the formation of films which have a particularly low tendency to pitting and a flawless surface as well as providing improved protection of the edges, it is advantageous to combine from 98 to 85% by weight of component (A) (the amino-epoxide resin) with 2 to 15% by weight of component (B) (amino-poly(meth)acrylate resin).

It has been shown that the elasticity and resistance to stone chipping of the films obtained may advantageously be improved by using 84 to 21% by weight of component (A) and 16 to 79% by weight of component (B). On the other hand, faults in adhesion to the underlying surface and rusting at the edges (according to the salt spray test) is improved in non-yellowing films without any loss of weathering resistance (loss of gloss, chalking) when 98 to 80% by weight of component (B) are combined with 2 to 20% by weight of component (A). The compositions indicated above are therefore preferred embodiments of the binders according to the invention.

EXAMPLES OF PREPARATION

Amino epoxy resin A1

21 g of diethanolamine, 10.2 g of 3-(N,N-dimethylamino)-propylamine and 61.6 g of an adduct of 116 g of 1,6-diaminohexane with 500 g of Cardura E 10 ®, the glycidyl ester of an α-branched $C_9$ to $C_{11}$ monocarboxylic acid, are added to a solution of 283.2 g of a polyglycidyl ether based on bisphenol A and having an epoxide equivalent of 472 in 161 g of butoxy ethanol. The mixture of polyether and amines undergoes reaction for 4 hours at temperatures of 85° to 90° C. with stirring. The mixture is then heated for 1 more hour at 120° C. to complete the reaction. The epoxide equivalent is then zero.

Amine number: 98 (mg. KOH per g of solid resin)
solids content: about 70% by weight.

Amino epoxy resin A2

706 g of a liquid epoxy resin based on bisphenol A and having an epoxide equivalent weight of about 260 are dissolved in 631 g of ethyl glycol acetate at 60° to 70° C. in a reaction vessel equipped with stirrer, thermometer, dropping funnel and reflux condenser. After the addition of 0.25 g of hydroquinone and 756 g of a semi ester of tetrahydrophthalic acid anhydride and hydroxyethylmethacrylate, the temperature is raised to 100°–110° C. The reaction is kept at this temperature until an acid number below 5 (mg KOH per g of solid) is obtained. The reaction product is then reacted with 1017 g of a 70% solution of a basic monoisocyanate in anhydrous ethyl glycol acetate at 60° to 70° C. The monoisocyanate was prepared by slow, drop wise addition of 241 g of dimethylaminoethanol to a solution of 471 g of tolylenediisocyanate in 305 g of anhydrous ethylglycol acetate at 20° to 30° C. with the exclusion of moisture.

The solvent was distilled off under a vacuum and diluted to 70% by weight with ethoxypropanol. Amine number: 70 (mg KOH per g of solid resin).

Amino-poly(meth)acrylate resin B1

725 g of butoxyethanol are heated to 110° C. under an inert gas while a reflux condenser is switched on. A mixture of 192 g of hydroxyethylacrylate, 137 g of butane diol monoacrylate, 228 g of glycidyl methacrylate, 364 g of 2-ethyl-hexyl acrylate, 439 g of butyl methacrylate, 438 g of methylmethacrylate, 90 g of styrene and 44 g of azo-bis-isobutylronitrile is added within 3 hours. The mixture is then kept at 110° C. for 1 hour, 6 g of azo-bisisobutylronitrile are added and the process is repeated after a further hour. A solids content of 72.2% by weight is found after 3 hours at 110° C. and a viscosity of 2.14 Pa.s at 25° C. is measured after dilution to 60% by weight with butoxyethanol. After the mixture has been cooled to 50° C., a mixture of 129 g of diethylamine and 201 g of isopropanol is rapidly added (1.10 mol of amine to 1.00 mol of epoxide). After 30 minutes, the reaction mixture is heated to 65° C. and then maintained at this temperature for 1 hour and finally heated to 105° C. and maintained for three hours. After cooling to 80° C., isopropanol and excess amine are carefully distilled off under vacuum. The solids content is adjusted to 78% by weight with butoxyethanol.

Final values:
Solids content: 78.7% by weight (30 min. 150° C.)
Amine number: 45 (mg KOH per g of solid resin)
Viscosity: 3.44 Pa.s (after dilution to 60% by weight with butoxyethanol)

Amino-poly(meth)acrylate resin B2

725 g of butoxyethanol are heated to 110° C. under an inert gas while a reflux condenser is switched on. A mixture of 20.7 g of butane diol diacrylate, 192 g of hydroxy ethyl acrylate, 137 g of butane diol monoacrylate, 251 g of cylcidyl methacrylate, 364 g of 2-ethyl-hexyl acrylate, 439 g of butyl methacrylate, 438 g of methyl methacrylate, 90 g of styrene and 44 g of azo-bisisobutyronitrile is added within 3 hours. The temperature is then maintained at 110° C. for 1 hour, 6 g of azo-bisisobutyronitrile are added and this process is repeated after a further hour. A solids content of 71.2% by weight (30 min 180° C.) is found after 3 hours at 110° C., and after dilution to 50% by weight with butoxy ethanol the viscosity is found to be 2650 mPa-s. at 25° C. After cooling to 50° C., a mixture of 142 g of diethylamine and isopropanol is rapidly added (1.10 mol of amine to 1.0 mol of epoxide). After 30 minutes, the mixture is heated to 65° C. and maintained at this temperature for 1 hour and subsequently heated to 105° C. and then maintained for 3 hours. After cooling to 80° C., isopropanol and amine excess are carefully distilled off under vacuum.

Final values:
Solids content: 77.2% by weight (30 min. 180° C.)
Amine number: 46 (mg KOH per g of solid resin)

Viscosity: 4.2 Pa.s (after dilution to 50% by weight with butoxyethanol)

Crosslinking Agent C1

1248 g of glycidyl ester of an α-branched $C_9$ to $C_{11}$ monocarboxylic acid (Cardura E ®) are heated to 100° C. under inert gas and 460.8 g of trimellithic acid anhydride are then added in several portions with vigorous stirring. The exothermic reaction is utilized to raise the temperature to 195° C. When the resin is clear, it is cooled to 145° C. and 1.8 ml of benzyl dimethyl amine are added as catalyst. When an acid number of 1 (mg KOH per g of solid resin) is reached, the product is cooled to 100° C. and diluted with 712 g of butoxyethanol.

Solids content: about 70% by weight (after 40 minutes heating to 180° C.)

Epoxide equivalent weight: >10,000.

Crosslinking Agent C2

666 g of isophrone diisocyanate and 134 g of trimethylol propane are mixed with 431 g of anhydrous ethylene glycol acetate and the mixture is heated to 60° C. within 1 hour with stirring under exclusion of atmospheric moisture. The initially solid trimethylolpropane melts and then reacts slowly within a further hour during which the temperature is raised to 90° C. To complete the reaction, the temperature is maintained at 90° C. for a further 3 hours, after which an isocyanate equivalent weight of 410 is obtained. 366 g of ε-caprolactam are added so slowly over a period of 3 hours that the reaction temperature does not exceed 100° C. This temperature is maintained until the isocyanate number has fallen below 0.1%. The solvent is then substantially distilled off under vacuum and the product is diluted to 80% by weight with butoxyethanol.

Crosslinking Agent C3

875 g of a reaction product of 1 mol of trimethylolpropane and 3.mol of tolylene diisocyanate (Desmodur L ®) dissolved to a concentration of 75% in ethyl acetate are heated to 90° C. with vigorous stirring and exclusion of moisture while anhydrous inert gas is passed over. 342 g of ε-caprolactam are added so slowly in 3 hours that a reaction temperature of 100° C. is not exceeded. This temperature is maintained until the isocyanate number has fallen below 0.1%. The solvent is substantially distilled off under vacuum and the product is diluted to 80% by weight with butoxyethanol.

EXAMPLE 1

108.4 g of titanium dioxide and 2.42 g of carbon black are ground up with 1.41 g of lead silicate and 3.04 g of lead octoate in 253 g of amino epoxy resin A2 and mixed with 3.1 g of amino-poly(meth)-acrylate resin B1 and 57.6 g of crosslinking agent C3. After neutralization with 5.96 g of formic acid, the mixture was diluted to 2 litres with completely desalted water. A zinc phosphatized car body panel was coated for two minutes at a bath temperature of 28° C. and 250 volts and then rinsed with water and stoved at 180° C. for 30 minutes. The stoved film was found to have a dry film thickness of 20 μm and was free from pitting.

Solids content about 18% by weight.

Comparison Example A

The same formulation as in Example 1 was used but amino-poly(meth)acrylate resin B1 was replaced by a larger quantity (284 g) of amino epoxy resin A2. The deposited film showed surface defects in the form of pits. Solids content about 18% by weight.

EXAMPLE 2

198 g of amino-poly(meth)acrylate resin B2, 22 g of amino epoxy resin A1, 85.5 g of a rutile pigment, 7.4 g of a commercial silicate-based extender and 18 g of ethoxy propanol are ground up in a pearl mill for 30 minutes at a temperature below 50° C. 79.6 g of crosslinking agent C2 are then added and the components are mixed under the dissolver and neutralized with 9.4 g of formic acid (50%). The mixture is carefully diluted to 2 litres with completely desalted water with stirring. Solids content about 15% by weight.

A zinc phosphatized steel plate is coated for two minutes at 150 volts and at about a temperature of 30° C. After rinsing with water and stoving at 180° C. for 30 minutes, a dry film thickness of 30 μm is obtained.

Comparison Example B

The same formulation as in Example 2 was used but amino epoxy resin A1 was replaced by a larger quantity (220 g) of amino-poly(meth)acrylate resin B2.

| Results of salt spray test according to DIN 50021 (504 h) | | |
| --- | --- | --- |
|  | Adhesion Faults | Edge Rusting |
| Comparison B | 6.5 mm | 5 |
| Example 2 | 2.5 mm | 0–1 |

We claim:

1. A non-autocrosslinking binder composition for water-dilutable lacquers, containing
   (A) 1 to 99% by weight of a saturated or unsaturated organic synthetic resin binder based on epoxide resins and containing primary or secondary hydroxyl groups or mixtures thereof and primary, secondary or tertiary amino groups or mixtures thereof; and
   (B) 99 to 1% by weight of saturated organic synthetic resin binder containing primary, secondary or tertiary amino groups or mixtures thereof and prepared from radically polymerisable monomers selected from monomers of the following formula:

$$-R-CH=CR'-X-A-N(R'')_2$$

wherein
   R = R' or $X-C_nH_{2n+1}$
   R' = H or $C_nH_{2n+1}$
   R'' = R', $C_nH_{2n}OH$ and/or $C_nH_{2n}NR_2$
   X = COO, CONH or O
   A = 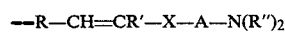

$C_nH_{2n}$ or $C_nH_{2n}OHCH-CH_2$
   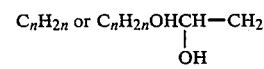
   |
   OH and n = 1 to 8, preferably 1 to 3,
   or from heterocyclic compounds containing vinyl-groups and having one or more basic nitrogen atoms.

2. A non-autocrosslinking binder composition according to claim 1, wherein component (A) is a basic addition product of epoxide resins and amines, which addition product is essentially free from epoxide groups and has an amine number of 45 to 120 mg KOH per g of solid resin, and a hydroxyl number of 50 to 500 mg KOH per g of solid resin.

3. A non-autocrosslinking binder composition according to claim 1, wherein component (A) is a basic addition product of epoxide resins and amines, which addition product is essentially free from epoxide groups and has an amine number of 30 to 150 mg KOH per g of solid resin, a hydroxyl number of 50 to 500 mg KOH per g of solid resin, a number average molecular weight ($\overline{M}n$) of 250 to 10,000 and a viscosity of 0.1 to 10 Pa in a 50% solution in monoglycol ethers at 25° C.

4. A non-autocrosslinking binder composition according to claim 1 wherein component (B) is a basic polymerization resin which is essentially free from epoxide groups and has an amine number of 30 to 150, and a hydroxyl number of 30 to 450.

5. A non-autocrosslinking binder composition according to claim 1 characterized in that component (B) is a basic polymerization resin which is free from epoxide groups and has an amine number of 30 to 150, a hydroxyl number of 30 to 450, a number average molecular weight ($\overline{M}n$) of 1000 to 500,000 and a viscosity of 0.1 Pa.s in a 50% solution in butoxyethanol at 25° C.

6. A non-autocrosslinking binder composition according to claim 1, wherein the component (B) is obtainable from free radical polymerisable
   (a) monomers containing amino groups, and
   (b) monomers containing hydroxyl groups, or
   (ab) monomers containing amino groups and hydroxyl groups and, in each case,
   (c) monomers which contain no reactive groups apart from an unsaturated bond, either 6 to 40 parts by weight of component (a) and 4 to 50 parts by weight of component (b) or 8 to 60 parts by weight of component (ab) being used per 10 to 90 parts by weight of component (c).

7. A non-autocrosslinking binder composition according to claim 6, wherein up to 10 parts by weight of the 10 to 90 parts by weight of component (c) are replaced by (d) polyunsaturated monomers.

8. A non-autocrosslinking binder composition according claim 1, wherein in addition to components A and B the composition also contains:
   (C) 5 to 50% by weight of crosslinking agents which are at least divalent and have a number average molecular weight ($\overline{M}n$) of 170 to 10,000, and contain blocked isocyanate groups and/or ester groups capable of transesterification, said percentages being based on the sum of the parts by weight of (A), (B) and (C) present.

9. Aqueous electro-dip lacquer cathodic coating compositions capable of being deposited at the cathode and comprising water, a synthetic resin binder according to claim 1 which has amino groups and can be rendered water soluble by protonization with acids, in combination with crosslinking agents and optionally hydroxy functional resins, and optionally containing one or more of conventional lacquer coating additives of the group consisting of pigments, fillers, corrosion inhibitors, lacquer auxiliaries, catalysts and organic solvents, which solvents when used are in amounts of up to 20% by weight, based on the total weight of the coating compound.

10. A method of coating an article which comprises immersing an article having an electroconductive surface at the cathode of a cathodic dip-coating bath in an aqueous electro-dip lacquer coating composition as set forth in claim 9 and cathodically applying said coating to the surface of said article.

11. Aqueous electro-dip lacquer cathodic coating compositions capable of being deposited on a conductive article at the cathode and comprising, water, a synthetic binder resin according to claim 1 solubilized by protonization with acids and a crosslinking agent and one or more conventional lacquer coating additives of the group consisting of pigments, fillers, corrosion inhibitors, lacquer, auxilliaries, catalysts and organic solvents.

* * * * *